United States Patent Office 3,431,777
Patented Mar. 11, 1969

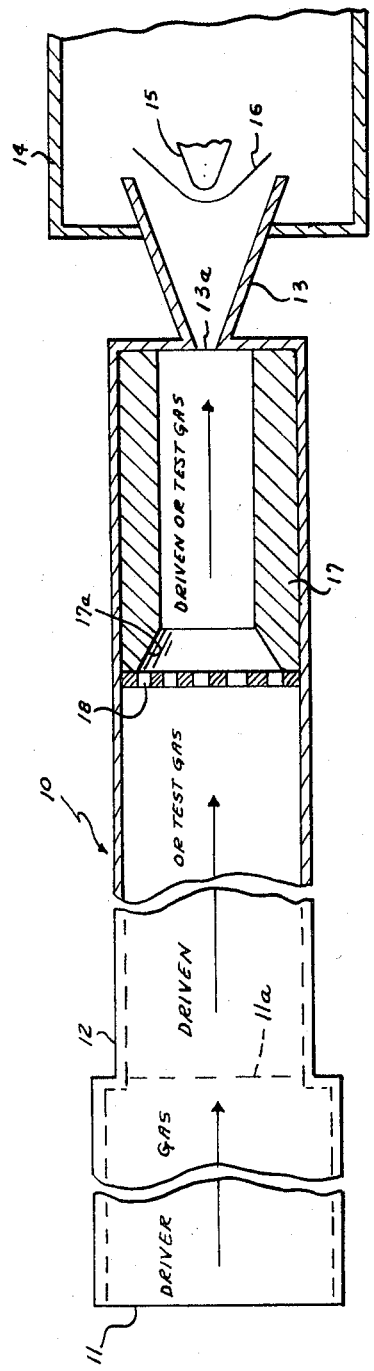

3,431,777
DEVICE TO INCREASE UNCONTAMINATED RUN TIME OF A REFLECTED SHOCK TUNNEL
Glenn D. Norfleet, Manchester, Tenn., assignor to the United States of America as represented by the Secretary of the Air Force
Filed Sept. 22, 1967, Ser. No. 669,958
U.S. Cl. 73—147
Int. Cl. G01m 9/00
5 Claims

ABSTRACT OF THE DISCLOSURE

A shock tunnel driver tube containing a supply of high pressure driver gas is attached to one end of a driven tube enclosing a column of low-pressure test gas and having an exhaust opening at the other end thereof. A reflected type expansion nozzle is formed on the exhaust opening end of the driven tube and the nozzle, in turn, is incorporated in one end of a model test chamber that is adapted to support a hypersonic test model therein.

The driver and driven tubes are separated by a frangible type diaphragm that normally prevents communication between the driver and driven gases until the pressure of the driver gas reaches a predetermined high value, as a result of the operation of the tunnel, to thereby rupture the diaphragm. A combined shock-generator grid element and area reduction bushing are mounted within the driven tube and are operative to form a reflected shock wave at an intermediate location substantially upstream in the driven tube and thereby provide relatively early interaction between the reflected shock wave and the gas interface and thus delay premature contamination of the test model chamber by the driver gas.

Background of the invention

This invention relates generally to the field of shock tube technology and, in particular, to improved means for increasing the available aerodynamic testing time in a reflected type shock tunnel.

The shock tunnel was developed as an improvement over conventional supersonic and hypersonic wind tunnels, and is specifically designed to test the "real-gas" effects of dissociation, ionization and chemical reactions of certain gas constituents occurring during the flight and, in particular, during the reentry into the earth's atmosphere of hypersonic vehicles such as satellites and intercontinental ballistic missiles. In the reflected type shock tunnel, which consists of a shock tube with an expansion nozzle added thereto, a high pressure driver gas is used to accelerate a low pressure driven or test gas up to speeds and at temperatures simulating the Mach numbers and high stagnation temperatures encountered by long range missiles and satellite vehicles.

A principal problem involved in the use of such reflected shock tubes and/or shock tunnels is the contamination of the driven or test gas by the driver gas. The contamination, which determines the test run time for many existing reflected shock tunnels, results from the reflected shock wave being formed by the collision of the incident shock wave with the end of the driven tube. This reflected shock wave strikes against the oncoming contact surface between the driver and driven or test gases, or gas interface and, although ideally this interface should be brought to rest by its interaction with said reflected shock wave; in practice, the interface continues to move downstream in the driven tube at a reduced velocity. Normally, the reflected shock wave has moved back upstream in the driven tube for only a relatively short distance away from the throat of the tunnel expansion nozzle before striking the gas interface moving downstream in the opposite direction and, as a result, the contaminated gas reaches the test model region at a relatively early time interval and the test run is ended.

In previously developed shock tunnels, contamination of the driven or test gas by the driver gas limited the steady flow conditions and, therefore, the usable test run times to only a fraction of a millisecond. By use of what is known as the "tailored interface" method, the uncontaminated test run times was increased by about an order of magnitude. This tailored interface condition occurred when the pressure rise across the reflected shock wave was the same in both driver and driven gases for a particular shock tunnel. In this event, the available test run time was increased and was terminated only by the flow of the last of the driven gas through the nozzle; however, the tailored interface method, which uses given compositions of driven and driver gases and promotes transmission of the reflected shock wave across the interface without further reflection, prevails for only one shock strength. Other methods of solving the above noted contamination have involved the use of a special piston device to separate the driver gas from the driven gas. The latter arrangement must generally include some additional means for exploding the piston and providing for disposal of the exploding parts before striking the test model. A third method involves the prevention of contamination by excessive mixing between the driver and driven gases at the contact surface region. In this method, the intermixed gas interface region is swept into a large dumping tank.

On the other hand, the arrangement of the present invention offers considerable improvement over these previously described methods by eliminating or, at least, substantially relieving this problem of contamination by use of a relatively simple but unique modification generally applicable to existing shock tunnel designs in a specific manner to be hereinafter summarized and described in detail.

Summary of the invention

The principal object of the present invention, therefore, is to delay contamination of the test model region of a reflected type shock tunnel by mounting a unique auxiliary shock producing device in the driven tube section of the tunnel to produce a reflected shock wave interacting with the gas interface between the driver and test gases at a position in the tunnel substantially further upstream from the end of the driven tube section than is the case for more conventional type shock tunnels not equipped with the present invention.

Another object of the invention resides in the incorporation of a novel and combined arrangement including an area reduction bushing and grid element positioned in the driven tube section of a reflected shock tunnel and adapted to increase the available aerodynamic testing run times by forming a stabilized, one-dimensional reflected shock wave that interacts with the gas interface at a relatively early position in its downstream travel in the driven tube and thus increasing the time interval remaining, after such interaction, before the slowed gas interface reaches and contaminates the model test area of the tunnel.

Other objects and advantages of the invention will become readily apparent from the following description, taken in connection with the single figure of the drawing, which represents a partially schematic, broken away and sectional view of the improved shock tunnel of the present invention.

Description of the preferred embodiment

Referring to the single figure of the drawing, the improved reflected shock tunnel of the present invention is indicated generally at 10 as including a driver tube or explosion chamber portion 11, a driven tube 12, a reflected type expansion nozzle 13, and a test chamber 14, in which is mounted an aerodynamic shaped test model 15 which forms the model shock wave illustrated at 16 when the tunnel is put in operation. Shock tunnel 10 may incorporate a first or main diaphragm at 11a for separating the driver tube 11 from the driven tube 12, and also a second diaphragm at 13a located at the throat of the expansion nozzle 13.

In normal operation, the diaphragm at 11a is ruptured when a relatively high pressure driver gas, such as hydrogen or helium, contained within the driver tube or explosion chamber 11 is fired to reach a preselected high pressure. This rupture of diaphragm 11a permits the sudden entry of the high pressure driver gas into the driven tube 12, where it forms an incident shock wave which compresses and heats a driven or test gas that is contained within driven tube 12 and which may consist of a column of air. At this point, in previously developed shock tunnels, the aforesaid incident shock wave would continue on downstream until striking the end of the driven tube to thereby form a reflected shock wave, which would then travel back upstream to normally strike against and interact with the oncoming gas interface or contact surface between the driver and driven gases traveling downstream in the driven tube at relatively high speed. While this interaction between the aforesaid reflected shock wave and the gas interface could theoretically bring the interface to a rest, in many existing shock tunnels, this interface actually continues to move downstream at a reduced velocity. Since this interaction normally occurs at a relatively short distance only upstream in the driven tube from the end thereof, contamination by movement of the interface into the model test chamber occurs at a relatively short time interval thereafter. In this connection, it has been found that for fairly high initial shock strengths, the downstream velocity of the gas interface is essentially independent of normal ratios between the nozzle throat and driven tube diameters. However, it has been experimentally determined in connection with the arrangement of the present invention, that the uncontaminated aerodynamic test run time available in present shock tunnels such as that indicated at 10 could be effectively increased by use of a combined arrangement consisting of the area reduction bushing 17, and the shock generator grid element 18. As clearly illustrated in the drawings, the bushing 17 is shown positioned with one end in contact with the downstream end of driven tube 12 and with its other end extending upstream to an intermediate position in tube 12 to terminate in an outwardly flared throad portion 17a. Thus, the bushing 17 is elongated to thereby reduce the cross sectional area of its fluid passage in a portion of the driven tube 12 extending upstream of its downstream end opening.

Combined with the above noted area reduction bushing 17 is the previously referred to shock generator grid element 18, which is shown mounted transversely of, and in contact both with, the inside diameter surface of the driven tube 12 and with the bushing 17 at its throat portion 17a. Said grid element 18 is designed to perform two main functions. First, it promotes relatively stabilized flow of the compressed and heated driven gas and, secondly, in concert with the area reduction bushing 17, it assists in the formation of a one-dimensional reflected shock wave upstream of the throat portion 17a. In this connection, the combined bushing and grid element 17, 18 of the present invention has been found both experimentally and in practice to be effective in approximately doubling the test run times of the shock tunnel utilized therewith. To this end, the gas interface interacts with the reflected shock wave formed by the present arrangement at a position in the driven tube 12 that is significantly further upstream therein than is the typical location of the position of shock interaction occurring at only a relatively short distance upstream in reflected type shock tunnels not equipped with the present invention. Thus, with the shock interaction occurring at the significantly further upstream position of the present arrangement, the slowed gas interface must travel a substantially longer distance than is normal after interaction before reaching and contaminating the test model region of the tunnel and, therefore, terminating the test run. As noted hereinabove, the time interval between such shock interaction and test termination has been approximately doubled with the use of the combined system of the present invention.

While a preferred embodiment of the present invention has been shown and described for purposes of exemplification, it is apparent that many modifications and changes may be made without departing from the true spirit and/or scope of the invention.

I claim:
1. In a shock tunnel having a driver tube containing a supply of driver gas under high pressure; an open-ended driven tube joined to said driver tube at the upstream end thereof and enclosing a column of test gas under low pressure and terminating in an exhaust opening at the downstream end thereof; a frangible-type main diaphragm normally separating said lever and driven tubes and retaining said driver gas in said driver tube until the driver gas is fired to reach a preselected high pressure causing the main diaphragm to rupture, said driver gas thereafter rushing into the driven tube to initially form an incident shock wave and compress and heat the column of test gas therein, and to subsequently discharge the column of test gas through its exhaust end opening, said incident shock wave normally traveling downstream the entire length of said driven tube before striking against the end of the driven tube to thus generate a reflected shock wave typically interacting with, and slowing down the oncoming gas interface between the driver and driven gases at a first position in the driven tube only a relatively short distance upstream from the end of the driven tube; a reflected-type expansion nozzle formed on the exhaust opening end of said driven tube for accelerating the test gas discharged therethrough to hypersonic velocity; a second, frangible-type diaphragm positioned in the throat of said nozzle for normally retaining said test gas in said driven tube until being ruptured by the firing of the driver gas and the resultant compression of the test gas; and a model test chamber formed at the discharge end of said nozzle and adapted to support a test model therein and receive the test gas being discharged thereinto at hypersonic velocity; the improvement comprising an auxiliary shock-generating mechanism mounted in, and extending upstream of the exhaust end opening of said driven tube and adapted to provide passage therethrough and promote further compression of the test gas being driven out of the driven tube by said driver gas, said shock-generating mechanism being further adapted to intercept said incident shock wave and generate a reflected shock wave therefrom interacting with the oncoming gas interface at a second position in said driven tube back upstream from said shock-generating mechanism and therefore at a relatively long distance from the end of said driven tube to thereby substantially increase the required length of travel of the gas interface, after the interaction, and thus lengthen the test run time available in the shock tunnel before contamination of the test model chamber by the driver gas occurs.

2. In a shock tunnel as in claim 1, wherein said auxiliary shock-generating mechanism includes grid element means transversely disposed in said driven tube in the path of the incident shock wave, and adapted to promote relatively free flow of the test gas therethrough and provide a relatively stabilized, one-dimensional reflected shock wave.

3. In a shock tunnel as in claim 1, wherein said auxiliary shock-generating mechanism comprises first area-reduction means mounted in said driven tube and extending upstream from a first position adjacent to the throat of said nozzle to a second position terminating at an intermediate location in said driven tube, said first means providing a reduced diameter fluid passage for the discharge therethrough of the test gas, and second, relatively thin, wafer-like element means shaped to conform with the inside diameter of said driven tube and positioned transversely of said driven tube in contact with the intermediately-located upstream end of said first, area-reduction means, said second element means being perforated to ensure stabilized flow therethrough of the test gas being driven by said driver gas and further promotes a one-dimensional reflected shock wave in combination with the reduced diameter fluid passage provided by said first, area-reduction means.

4. In a shock tunnel as in claim 3, said first, area-reduction means comprising a relatively elongated bushing mounted on the inside diameter surface of said driven tube and forming a fluid passage extending from a downstream opening in alignment with, and overlapping the throat of said expansion nozzle and extending upstream to an outwardly-flared, opening or throat portion terminating at a position adjacent to, and in contact with said second, wafer-like, perforated element means.

5. In a shock tunnel as in claim 1, said shock-generating mechanism comprising a relatively elongated, area-reduction bushing providing a reduced-diameter open fluid passage and positioned within said driven tube in extending relation between the downstream end thereof and an upstream end terminating in an outwardly-flared throat portion, the latter being positioned in said driven tube at a location extending a sufficient distance downstream of the juncture between the driver and driven tubes to permit the formation of a relatively stabilized incident shock wave upstream of said area-reduction bushing; and a transversely-disposed generator grid element positioned in said driven tube immediately in front of the throat portion of said bushing to act on the incident shock wave and, in combination with said bushing, generate a reflected shock wave that is one-dimensional in form and interacts with the gas interface upstream of said throat portion and at a significantly greater-than-normal distance from the test model area of the tunnel to thereby increase the length of travel required of said gas interface after shock interaction, and the uncontaminated aerodynamic test run time.

References Cited

UNITED STATES PATENTS 3,335,601 8/1967 Feldman et al. _____ 73—12
3,374,668 3/1968 Godfrey _____ 73—147

LOUIS R. PRINCE, *Primary Examiner.*

M. J. NOLTON, *Assistant Examiner.*

U.S. Cl. X.R.

3—12; 138—44